United States Patent [19]

Tannenbaum et al.

[11] 3,878,049

[45] Apr. 15, 1975

[54] BIOCHEMICAL TEMPERATURE-SENSITIVE PROBE AND METHOD FOR MEASURING REACTANT CONCENTRATIONS THEREOF

[75] Inventors: Steven R. Tannenbaum, Framingham; James C. Weaver, Wayland; Charles L. Cooney, Brighton, all of Mass.

[73] Assignee: Massachusetts Institute of Technology, Cambridge, Mass.

[22] Filed: Apr. 3, 1973

[21] Appl. No.: 347,574

[52] U.S. Cl. .......... 195/103.5 R; 195/127; 204/1 T; 204/195 B
[51] Int. Cl. ............................................ C12k 1/04
[58] Field of Search .................... 195/103.5 R, 127; 204/195 B

[56] References Cited
UNITED STATES PATENTS

| | | | |
|---|---|---|---|
| 3,403,081 | 9/1968 | Rohrback et al. | 195/127 X |
| 3,776,819 | 12/1973 | Williams | 204/195 B |

Primary Examiner—A. Louis Monacell
Assistant Examiner—Robert J. Warden
Attorney, Agent, or Firm—Arthur A. Smith, Jr.; Paul J. Cook; Robert Shaw

[57] ABSTRACT

A biochemical sensing apparatus is provided for measuring the concentration of a substrate by measuring the change in temperature evolved by the reaction of the substrate with an enzyme or microorganism. The apparatus includes a reference thermal probe and a second thermal probe coated with an enzyme or microorganism. The probes are formed of a material which exhibits a change in an electrical property such as electrical resistance or voltage as a function of temperature and the probes form part of a bridge circuit. An electrical current or voltage generator and means for measuring the difference in current, voltage or resistance are associated in circuit relationship with the probes.

11 Claims, 2 Drawing Figures

BIOCHEMICAL TEMPERATURE-SENSITIVE PROBE AND METHOD FOR MEASURING REACTANT CONCENTRATIONS THEREOF

BACKGROUND OF THE INVENTION

This invention relates to temperature-sensitive apparatus having a probe coated with a microorganism or an enzyme which apparatus is suitable for measuring the concentration of molecules which are substrates for the microorganism or enzyme and to its method of use.

Enzymes and certain microorganisms such as bacteria or yeasts are known to be selective in catalyzing a reaction, involving a specific substrate. Based upon this property, these materials have been employed in a wide variety of detection techniques to determine the presence of and the concentration of the substrate. For example, enzymes and microorganisms have been employed in colormetric reactions wherein the reaction product has a different color than the starting material and the degree of color change is measured by light absorbence. This measurement then can be related to the concentration of the reactant based upon a prior-obtained calibration curve. In addition, biochemical sensors have been employed for determining the concentration of the molecules involving the use of a reference electrode and a biochemical electrode whereby change in potential is measured and this change is correlated to the concentration of the molecule. The biochemical electrode is intimately contacted with an enzyme or bacteria which enzyme or bacteria reacts selectively with the molecule being surveyed to cause a change in the potential between the biochemical electrode and the reference electrode. The use of these biochemical sensors is limited since they require the use of electrodes adapted to measure the presence of a specific ion generated during reaction and furthermore are somewhat complicated in structure and are bulky. Furthermore, they must be used in conjunction with an electrolyte, which electrolyte will differ depending upon the type of electrode and type of reaction being employed. Thus, these biochemicals sensing systems are undesirably limited in that only a limited number of reactants can be monitored therewith. Furthermore, because of their bulk and because of the need for employing an electrolyte, a relatively large volume of reactant is necessary in order to obtain accurate results.

It would be highly desirable to provide biochemical sensin apparatus which could be used to detect the concentration of a wide variety of molecules. Furthermore, it would be highly desirable to provide a biochemical sensing apparatus of simple construction and of small volume and which does not require the presence of an electrolyte so that small volumes of samples such as physiological fluids in situ can be tested to determine the concentration of molecules.

SUMMARY OF THE INVENTION

This invention provides a process and apparatus for determining the concentration of molecules by monitoring the temperature change caused by the selective reaction of the molecule catalyzed with an enzyme or a microorganism. The apparatus comprises two thermal sensors, one of which is coated with a microorganism or an enzyme while the other sensor is not coated with such a microorganism or enzyme. Thus, the probe coated with the microorganism or enzyme senses the temperature change caused by the reaction at that probe surface. The other probe, which may be coated or uncoated, but in any event not coated with the same microorganism or enzyme as the other probe, senses the ambient temperature. The probes are formed from a material which exhibits a change in an electrical property such as electrical resistance or voltage responsive to a change in temperature and are in circuit relationship with a means for measuring the change in electrical current voltage or resistence, responsive to temperature.

DETAILED DESCRIPTION OF THE DRAWINGS

Figure 1:
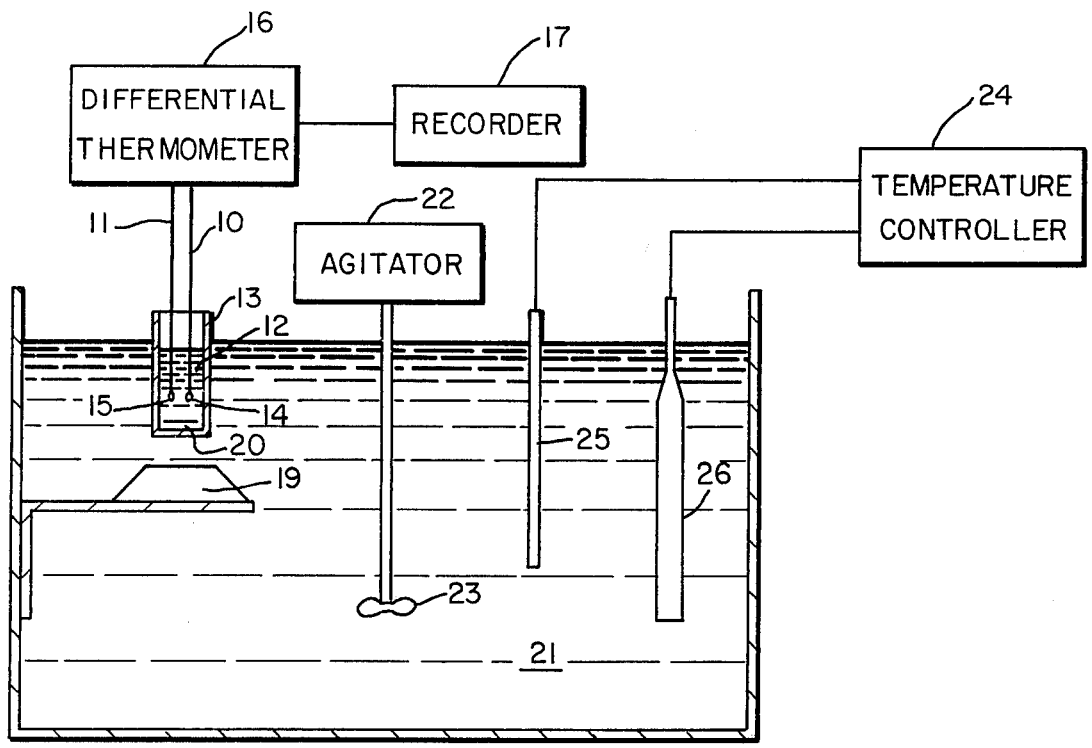
FIG. 1 is an elevational cross sectional view of the apparatus of this invention.
Figure 2:
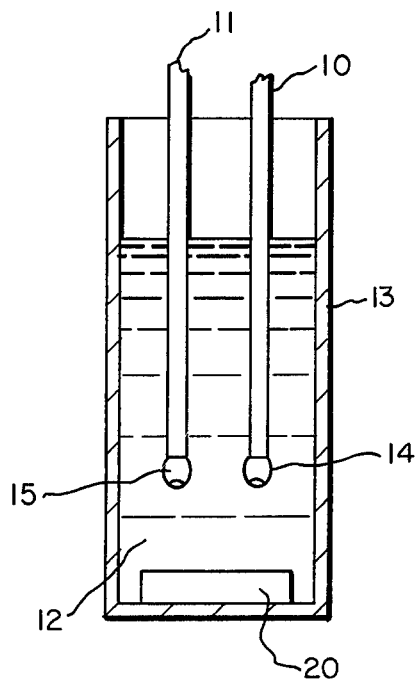
FIG. 2 is a detailed view of the coated thermo probe system of this invention.

Referring to FIG. 1, probes 10 and 11 are immersed into a liquid 12 contained in container 13. The liquid 12 contains the reactant upon which the test is being conducted. The tip 14 of probe 10 is coated with an immobilized microorganism or enzyme which catalyzes the reaction of or reacts with the reactant being tested. When reaction is effected a temperature change results at the surface of the probe tip 14. The tip 15 of probe 11 either is uncoated or preferably is coated with a matrix having essentially the same heat of solution as the coating on probe 14. The coating on probe tip 15 can be free of a microorganism or enzyme or can contain a microorganisms or enzyme; but in any event does not contain a microorganism or enzyme which effects the same type of reaction as occurs at the surface of probe 14. Only in this manner can a meaningful differential temperature reading be obtained.

The probe tips 14 and 15 are in circuit relationship with an electrical current or voltage generator (not shown) and are formed from a material which exhibits a change in an electrical property such as electrical resistance or voltage with temperature. The probe tips 14 and 15 can themselves be the electrical current or voltage generator. For example, pyroelectric devices or thermocouples generate voltage or current proportion to change in temperature. The two probes are connected to a bridge circuit having an electrical current generator and to balanced resistances so that a differential current is generated which is directly proportional to the resistances of the probes. The bridge circuit and electrical currents generator are housed in container 16 labeled "differential thermometer". The particular bridge circuit or source of electrical current employed is not critical to this invention and any suitable circuit means can be employed in conjunction with the probes. The differential thermometer is connected electrically to any suitable recorder 17 which is adapted to record the differential current as a function of time. The container 13 which houses the reactant-containing liquid 12 is stirred during temperature measurements by means of magnetic stirrer 19 and magnetic stirring bar 20. The container 18 is immersed in a constant temperature bath 21 which is stirred by means of motor 22 and stirrer 23. The bath 21 is maintained at a constant temperature by means of any suitable temperature controller 24 having a thermometer 25 and a heater 26 is maintained either on or off dependent upon the temperature measured by thermometer 25 and sensed by controller 24.

The differential thermometer, as well as containing the bridge circuit and electrical current generator, also can contain a differential amplifier. A suitable differential amplifier is manufactured by Princeton-Applied Research Corp., P.O. Box 565 Princeton, N.J., identified as Lock-In-Amplifier Model JB-5.

The thermal probes can comprise any of a wide variety of available thermal measuring instruments such as thermistors, piezoelectric or pyroelectric devices, thermocouples, platinum resistance wires or the like. Exemplary suitable thermistors are manufactured by the Yellow Springs Instrument Company, Yellow Springs, Ohio identified as part No. 44201 in a catalog published September 1971.

DESCRIPTION OF SPECIFIC EMBODIMENTS

This invention provides substantial advantages over the prior art processes and apparatus for measuring the concentration of molecules. The actual structure of the probe is quite simple since all that is necessary is that the probe tip in contact with the fluid containing the reactant be coated with an enzyme or microorganism in a matrix which adheres to the probe tip. Furthermore, the probes of this invention can comprise very small volumes in the order of 0.001cc or less. Furthermore, the apparatus of this invention can effect the necessary temperature measurements within a relatively short period of time and is capable of effecting a direct electrical output which can be measured accurately by a wide variety of available electrical measuring instruments. Furthermore, the apparatus of this invention does not require the use of fluids having a specific chemical composition to perform its function. Thus, all that is required is that the physical and chemical make-up of the surrounding fluid permits the enzyme or microorganism to catlyze the reaction with the reactant being tested. Furthermore, since the apparatus of this invention does not require that the reaction catalyzed by the enzyme or microorganism form a particular class of ions, the particular type of enzyme or microorganism employed is not limited. Thus, any enzyme or microorganism capable of catlyzing or entering into a reaction with the reactant being tested can be employed in this invention.

The enzyme or microorganism is contacted with the probe by placing it in a matrix, which matrix is adapted to adhere to the surface of the probe tip. This results in the enzyme or microorganism being "immobilized" so that it is retained at the surface of the probe. It is not necessary that the microorganism or enzyme be retained in the matrix for an indefinitely long period. All that is necessary is that it be retained sufficiently strongly so that any diffusion thereof away from the probe occurs over a period of time much longer than the period of time necessary to obtain the temperature readings when the probe is immersed in the fluid being tested. Generally the period of time necessary to obtain the temperature readings is less than about 5 minutes and more particularly less than aoubt 2 minutes.

Presently, there are available a wide variety of techniques for immobilizing a microorganism or an enzyme in a matrix. Nonlimiting exemplary techniques include crosslinking an enzyme with a dialdehyde such as glutaraldehyde, coupling the enzyme or microorganism to an acrylamide polymer and copolymer such as with diazotization linkage or by physically entrapping the microorganism or enzyme in a gel or by chemical or physical adsorption on the probe surface. These and other techniques for immobilizing the microorganism or enzyme are well known in the art and need not be described in detail herein.

Any available enzyme, whether naturally occurring or synthetically produced and whether or not in a pure form can be employed in the present invention. Representative enzymes include oxidoreductases, transferases, hydrolases, lyases, isomerases and ligases. Representative suitable specific enzymes are hexokinase, trypsin, urease, pepsin, amylase, chymotrypsin, carboxypeptidase, ficin, papoin, lysozymer, chymopapain, invertase, glucoamylase, glucose oxidase, galactose oxidase, uricase, penicillinase, ethanol dehydrogenace, amino acid oxidase, or the like. Representative suitable microorganisms are yeasts, fungi, the anaerobic bateria are aerobic bacteria which can be employed either or with can be used to measure substrates in liquid, gases or liquids saturated with gas. Representative suitable microorganisms include *Escherichia coli*, *Bacillus subtillis*, *Clostridium sporogenes*, *Klebsiella aerogenes*, *Pseudomonas* species, *Candida* species, *Saccharomyces* species, Fungal spores such as from *Aspergillis niger*, *Actinomyces* species.

While the present invention has been described above with reference to the use of two thermal probes, it is to be understood that more than one thermal probe can be coated with the enzyme or the microorganism can be employed together with a reference thermal probe. The use of more than one enzyme or microorganism-coated thermal probe has the advantage of averaging out any errors due to outside factors regarding temperature. The additional coated thermal probes can be connected into the bridge circuit in any manner well known in the art to average outside temperature effect.

Surprisingly, it has been found that at moderate substrate concentration the differential temperature measured by the referenced probe and the one or more probes containing the enzyme or microorganism is essentially independent of the thickness of an unstirred boundary layer between the probe surface and the bulk liquid containing the reactant as well as the concentration of active enzyme or microorganism on the probe surface. Accordingly, neither the concentration per unit area of enzyme or microorganism for the degree of stirring is essential to the success of the present invention.

In one aspect of the present invention, both probes can be coated with a different microorganism or enzyme so long as the reactant fluid reacts only at one probe surface while the other probe surface acts as a reference probe. This construction has the advantage that it can be employed to determine the concentration of two different types of molecules in two different fluids.

Furthermore, the coated probe can be coated with more than one enzyme or microorganism. For example, when coated with two enzymes one enzyme catalyzes a first reaction with the evolution of a first reaction product and this product enters into a second reaction catalyzed by a second enzyme. Each reaction thus causes a change in temperature at the probe surface and the total change is measured. For example, hexokinase and a phosphatase can be included in the coating to catalyze the reaction of glucose to glucose-6-phosphate while consuming ATP. Thereafter, the phosphotase converts glucose-6-phosphate to glucose.

Thus, the cycling of glucose in the reaction effects a desirable amplification of the signal generated by the heat of the reaction.

In use, the thermal probes are calibrated by measuring the differential temperature occuring at the probe surfaces in fluids containing a known concentration of the molecule being tested. In this manner, a curve is established which relates the differential temperature with the concentration of the molecule. Generally, these curves show an initially linear relationship between differential temperature and concentration which gradually levels off at an asymptote. Once the standard curve for the particular set of probes is established, the application can be employed to measure the concentration of a substrate by reading the differential temperature at the linear portion of the curve.

The following examples illustrate the present invention and are not intended to limit the same.

EXAMPLE I

This example illustrates the use of a probe containing hexokinase to measure either glucose or ATP concentration.

The enzyme hexokinase catalyzes the transfer of a phosphate from adenosine triphosphate (ATP). The equilibrium constant for this reaction is $3.86 \times 10^2$ and the enthalpy for the reaction is 3.97 kcal/mole. Hexokinase derived from yeast (Sigma Biochemical co.) was immobilized onto the surface of a thermistor (Yellow Springs type 44201) by glutaraldehyde crosslinking. The thermistor was placed in 0.25 ml of hexokinase solution containing 1.025 mg of protein per ml. After 20 minutes of incubation at room temperature, 25 ul of a 2.5% glutaraldehyde was added to the solution and mixed. The probe was incubated for an additional 80 minutes at room temperature and then washed with an excess of cold 0.1M Tris buffer at pH 7.5. The probe was then placed in 0.2 ml of hexokinase solution to react with unreacted glutaraldehyde.

The probe was calibrated by determining its catalytic activity in the following manner: to 1.75 ml of pH 7.5, 0.1M Tris buffer containing 10 mM $MgCl_2$ and 5mM EDTA we added 0.01 ml of 1.0Ml glucose, 0.01 ml of a glucose-6-phosphate dehydrogenase solution containing $6.8 \times 10^{-3}$ mg protein, 0.1 ml of a nicotinamide adenine dinucleotide phosphate (NADP) solution with 40 mg of NADP per ml of Tris buffer, and 0.50 ml of an adenosine triphosphate (ATP) solution with 0.080gm of ATP per 10 ml of pH 7.5 Tris buffer. The solution was well mixed in a cuvette. The hexokinase coated probe was dipped into the stirred cuvette and every five minutes the absorbance at 340 mm was measured. The rate of absorbance change is proprtional to the activity of the hexokinase. Probes prepared in the foregoing manner will catalyze the formation of glucose 6-phosphate at a rate of 0.005 mmoles/ml/min or better.

This thermistor probe coated with hexokinase was placed in the bridge circuit described above and balanced with a second identical thermistor which was coated with bovine serum albumin (BSA). The probe was coated with BSA to eliminate non specific effects such as absorption of proteins. The BSA coated probe has no catalytic activity in the reaction mixture. The BSA coated probe was prepared in a manner identical to the hexokinase coated probe except that BSA replaced the hexokinase in the crosslinking reaction.

These two probes constitute the temperature sensing device for the analysis of adenosine triphosphate or glucose. When placed in bridge circuit as described above, the probe with hexokinase will exhibit a temperature differential with the BSA-coated probe when ATP and glucose are present. To test this, the probes were placed in a well stirred reaction vessel with 8 ml of a reaction mixture containing 12 mg of ATP 10 mM $MgCL_2$, and 5mM EDTA in pH 7.5, 0.1M Tris buffer. The temperature was maintained at 28.5°C. The differential thermometer was set at zero when in the above system. To initiate the test 0.050 ml of 1.0 M glucose was added to the reactor. The probes immediately responded with a temperature decrease due to the addition of a cooler liquid and mixing effects. Then within 45 seconds the temperature of the enzyme coated probe rose to a new equilibrium value to a peak of 0.0008°C above the BSA coated probe. After 20 minutes, the system returned to a steady state about 0.0003°C above the original steady state. The enzyme on the hexokinase probe could catalyze the formation of glucose 6-phosphate at a rate of 0.013 mmoles per minute.

EXAMPLE II

The proteolytic enzyme trypsin which has esterase activity was immobilized on the surface of a thermistor Yellow Springs type 44014 by glutaraldehyde crosslinking. A 1 mg/ml solution of trypsin dissolved in pH 8.0 Tris buffer with 2.22 mg/ml of $C_aCl_2$ was prepared. The thermistor probe was placed in 0.4 ml of this solution for twenty minutes. Then 0.005 ml of a 2.5% glutaraldehyde solution was added to effect crosslinking of the enzyme. This system was incubated for one hour at room temperature (about25°C) and then the probe was removed from the reaction mixture and placed in 0.4 ml of the above described trypsin and buffer solution for 20 minutes at room temperature to permit unreacted glutaraldehyde to react with the excess trypsin. An alternative approach used by us and others is to place the probe in ice cold 0.5M sodium borohydride to reduce unreacted glutaraldehyde. In either case, the probes are then washed well with excess pH 8 Tris buffer.

To calibrate the probe, its catalytic activity is measured by following the hydrolysis of N-Benzoyl-Arginine-Ethylester (BAEE) spectrophotometrically. An assay mixture is prepared by adding 0.05 ml of a solution with 17 mg of BAEE/ml of Tris pH 8.0 buffer to 2.45 ml of 0.05 M pH 8.0 Tris buffer in a cuvette. The initial absorbance at 253 nm of this solution is measured. The trypsin coated thermistor probe is dipped into the stirred cuvette and every five minutes the absorbance at 253 nm is determined. After 20 minutes, the probe is removed and the assay mixture is incubated for an additional 5 minutes before a final reading is taken. This latter step is taken to measure the activity of any trypsin not permanenetly immobilized on the probe. Probes prepared in the aforegoing manner are able to hydrolyze BAEE at a rate in excess of 5 mmoles/min at room temperature at pH 8.0.

The trypsin coated probe is connected into the bridge circuit described in Example 1. In addition, a similar thermistor coated with serum albumin, a protein with no enzymic activity in the reaction mixture, was connected in the circuit. This probe was prepared according to the description in Example 1. These two probes constitute the differential temperature sensor since, in the presence of a substrate for trypsin, the trypsin-catalyzed reaction will only take place on one probe and thus the heat effect will only occur on that one probe.

Using the apparatus described above, these probes were placed in a reactor containing 8 ml of 0.05 M Tris buffer. The reaction system was allowed to come to temperature equilibrium. When an additional 0.2 ml of Tris buffer was added, the thermistor probes responded with a short trasient response due to the different temperature of the added solution and to the mixing effects. Within 18 seconds the probes indicated zero temperature differential, which was identical to that observed prior to buffer addition. When 0.2 ml of buffer containing $10^{-5}$ mole of BAEE were added to the reaction system, a transient temperature change was observed which was only 12 seconds in duration before the probes registered a steady state temperature differential of 0.5 m°C. The heat of reaction from the trypsin-catalyzed BAEE hydrolysis accelerated the transient period observed after sample addition and produced a steady state temperature differential between the two probes of 0.5 m°C.

What is claimed is:

1. An apparatus for measuring the concentration of a substrate in a fluid which comprises a reference thermal probe, a second thermal probe coated with a microorganism or an enzyme, said probes being formed of a material which exhibits a change in a measurable electrical property as a function of temperature, and means for measuring the difference in said measurable electrical property of said probes.

2. The apparatus of claim 1 having a plurality of second thermal probes each coated with the same microorganism or enzyme.

3. The apparatus of claim 2 wherein the second pro is coated with an enzyme.

4. The apparatus of claim 1 wherein said second probe has a coating containing at least two enzymes, one enzyme adapted to cause the reaction of a substrate with the attendant formation of a first reaction product and at least one other enzyme adapted to effect a second reaction involving said first reaction product.

5. The apparatus of claim 1 wherein said reference probe is coated with an enzyme or a microorganism different from that on said second probe, said apparatus adapted to be used to measure the concentration of a substrate in a fluid which fluid contains only one substrate reactive with any of the enzymes or microorganisms or said probe.

6. The apparatus of claim 5 wherein each probe is coated with a different system.

7. The apparatus of claim 1 wherein said reference thermal probe is coated with a material having a heat of solution similar to the heat of solution of a matrix to which the enzyme or microorganism is attached on said second probe.

8. The apparatus of claim 4 wherein the second probe is coated with an enzyme.

9. The apparatus of claim 1 wherein the second probe is coated with an enzyme.

10. A process for measuring the concentration of a substrate in a fluid which comprises contacting an apparatus for measuring the concentration of a substrate in a fluid with at least two fluids each containing a known concentration of said substrate to calibrate said apparatus, said apparatus comprising a reference thermal probe, a second thermal probe coated with a microorganism or an enzyme, said probes being formed of a material which exhibits a change in an electrical property as a function of temperature, and means for measuring the difference in said measurable electrical property of said probes, and thereafter placing the probes in a fluid containing the substrate and measuring the difference of the measurable electrical property of said probes which difference is caused by a change in temperature at the surface of the second probe resulting from a chemical reaction involving said substrate and said enzyme or microorganism.

11. The process of claim 10 wherein said reference probe is coated with an enzyme or a microorganism different from that on said second probe, calibrating said apparatus by first contacting said probes with at least two fluids each containing a known concentration of a substrate for the enzyme or microorganism on only one probe and measuring the difference in said measurable electrical property of said probes, contacting said probes with at least two fluids each containing a known concentration of one substrate for an enzyme or microorganism on one probe but not for the enzyme or microorganism on the other of said probes and measuring the difference in said measurable electrical property of said probes and thereafter placing the probes in a fluid containing only one of said substrates and measuring the difference in said measurable electrical property of said probes.

* * * * *

UNITED STATES PATENT OFFICE
CERTIFICATE OF CORRECTION

Patent No. 3,878,049            Dated April 15, 1975

Inventor(s) Steven R. Tannenbaum, James C. Weaver, Charles Cooney

It is certified that error appears in the above-identified patent and that said Letters Patent are hereby corrected as shown below:

Insert as the second paragraph in the section entitled "ABSTRACT":

--The invention herein described was made in the course of work performed under a contract with the Army Electronics Command, Department of the Army.--

Signed and Sealed this twenty-third Day of September 1975

[SEAL]

Attest:

RUTH C. MASON  
Attesting Officer

C. MARSHALL DANN  
Commissioner of Patents and Trademarks